(12) United States Patent
Gail et al.

(10) Patent No.: US 6,695,314 B1
(45) Date of Patent: Feb. 24, 2004

(54) BRUSH SEAL

(75) Inventors: Alfons Gail, Friedberg (DE); Klemens Werner, Munich (DE)

(73) Assignee: MTU Aero Engines GmbH, Munich (DE)

( * ) Notice: Subject to any disclaimer, the term of this patent is extended or adjusted under 35 U.S.C. 154(b) by 54 days.

(21) Appl. No.: 09/914,078
(22) PCT Filed: Dec. 13, 2000
(86) PCT No.: PCT/DE00/04421
§ 371 (c)(1), (2), (4) Date: Feb. 14, 2002
(87) PCT Pub. No.: WO01/48887
PCT Pub. Date: Jul. 5, 2001

(65) Prior Publication Data
(65)

(30) Foreign Application Priority Data
Dec. 23, 1999 (DE) .......................... 199 62 316

(51) Int. Cl.⁷ ............................................. F16J 15/16
(52) U.S. Cl. ...................................................... 277/355
(58) Field of Search ........................................ 277/355

(56) References Cited

U.S. PATENT DOCUMENTS

| 4,274,575 | A | * | 6/1981 | Flower ......................... 228/160 |
| 5,026,252 | A | * | 6/1991 | Hoffelner .................. 415/174.2 |
| 5,758,879 | A | | 6/1998 | Flower |
| 6,352,263 | B1 | * | 3/2002 | Gail et al. .................... 277/355 |
| 6,428,009 | B2 | * | 8/2002 | Justak ........................... 277/355 |
| 2001/0004145 | A1 | * | 6/2001 | Wright et al. ................ 277/355 |
| 2002/0000694 | A1 | * | 1/2002 | Justak ........................... 277/355 |

FOREIGN PATENT DOCUMENTS

| DE | 19618475 | 11/1997 |
| DE | 19803502 | 8/1999 |

* cited by examiner

Primary Examiner—Anthony Knight
Assistant Examiner—E Peavey
(74) Attorney, Agent, or Firm—Crowell & Moring LLP

(57) ABSTRACT

The invention relates to a brush seal for sealing a rotor against a stator. A brush housing is provided for fastening brushes whose free ends are directed towards the stator or rotor. The brush housing is held on the rotor or stator and has a support plate. In the brush seal the free ends of the brushes are provided with a slide-ring to improve the sealing effect and reduce the wear.

48 Claims, 4 Drawing Sheets

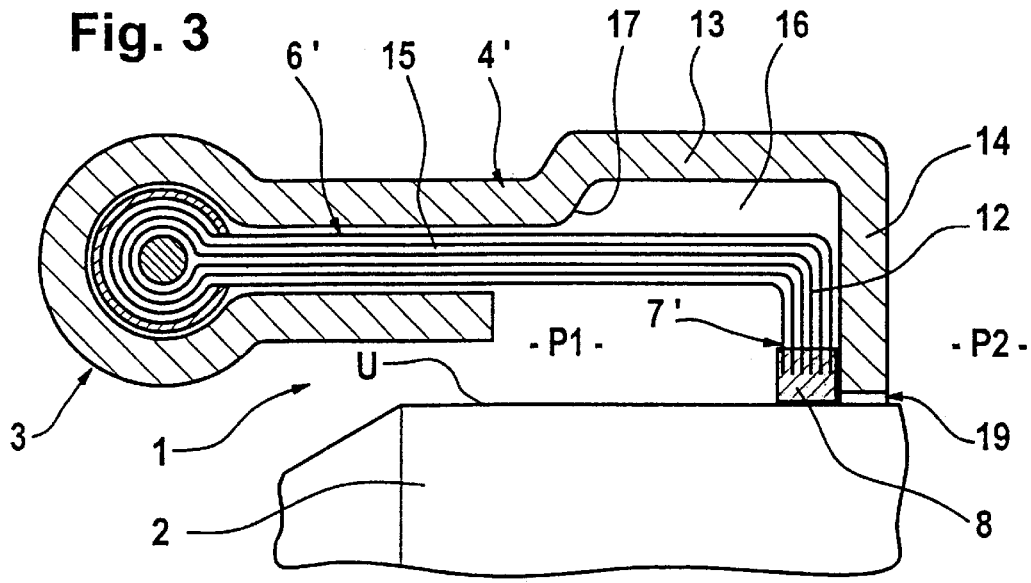
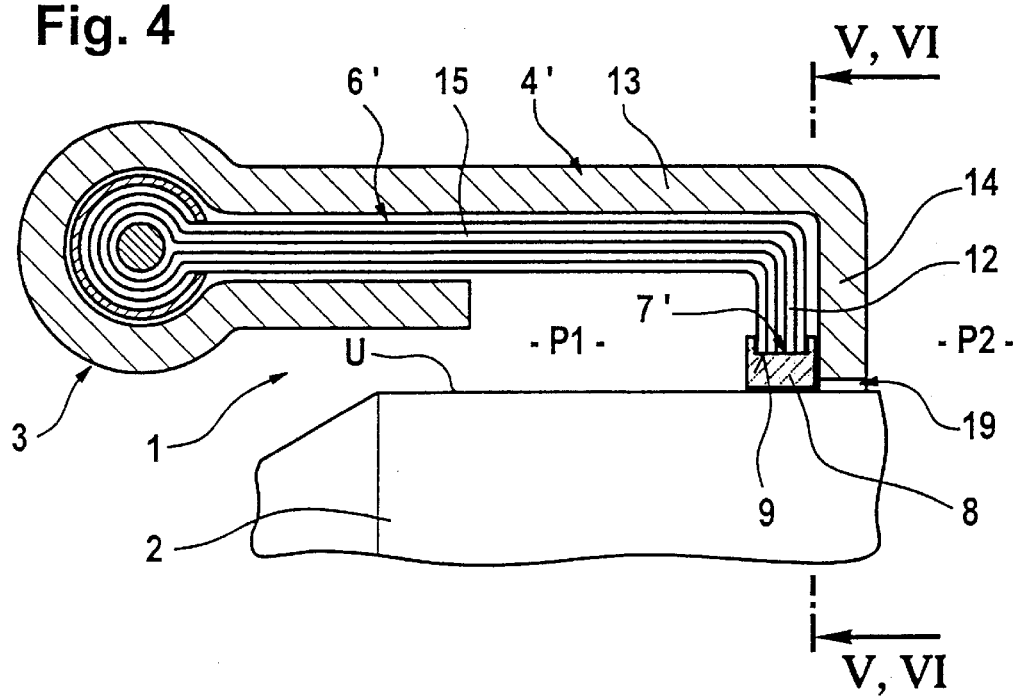

BRUSH SEAL

BACKGROUND AND SUMMARY OF THE INVENTION

The invention relates to a brush seal for sealing a rotor against a stator, comprising a brush housing for fastening brushes whose free ends are directed towards the stator or rotor, which brush housing is held on the rotor or stator and has a support plate.

In known brush seals, the free ends of the brushes, which are fastened in a brush housing having a front plate and a support plate, run against a sealing surface of the rotor or stator and, by this means, seal a gap between rotor and stator. When used in stationary gas turbines or aircraft engines, it is possible by means of such brush seals to economize on axial installation space, with good sealing effect in the usual arrangement, as compared with alternative seals which can be used, such as labyrinth seals.

A brush seal is known from DE 196 18 475 A1 whose brushes are angled to reduce the radial installation length. In order to improve the increased stiffness of the short, angled brush sections, a stop located in the region of the shaft sections of the brushes is provided which acts as a bending edge when the elastic brushes are deflected as a consequence of eccentricity of the rotor. In this way, the stiffness of the brushes can be adjusted without requiring an unallowably large, radial installation space.

During operation, a local temperature increase, which increases the wear, occurs at the sealing surface of the rotor or stator because of the contact with the brushes, which generally consist of steel. In addition, the small leakage which always occurs between the brushes could be reduced.

The problem on which the present invention is based consists in providing a brush seal, of the generic type described at the beginning, in which the sealing effect and the wear behavior of the brushes is further improved.

The solution of the problem is, according to the invention, characterized in that the free ends of the brushes are provided with a slide-ring for sealing the rotor against the stator.

The advantages lie in the combination of the high level of elasticity of a brush seal, by means of which the slide-ring fastened to the free ends of the brushes can readily adapt to rotor or stator deflections which are generally radial, for example between 0.2 and 0.8 mm (when the gas turbine is being started), and the excellent sliding properties of the slide-ring, which runs against the sealing surface on the rotor stator and, by this means, seals the gap between rotor an stator ver an area. In consequence, a leak generally present in the gap region through the brushes of a brush seal is avoided. Because of the better sliding properties of the slide-ring, in comparison for example with steel brushes, less wear and a smaller increase in temperature occurs at the sealing surface on the rotor or stator. The slide-ring consists of a material which has better sliding properties than the brushes, consisting of steel, of the brush seal. In consequence, the support of the slide-ring on the low-pressure end support plate in the presence of a differential pressure is also advantageous without brush hooking or the like occurring there.

The slide-ring can consist of carbon because a carbon ring can be employed even at the high temperatures occurring in stationary gas turbines or aircraft engines and carbon has better sliding properties than steel, of which the brushes consist. As an alternative, the slide-ring can also, for example, consist of a sintered metal with sliding properties.

The slide-ring can have a single-piece configuration or be segmented. In the case of a segmented slide-ring in a rotor which is directed, in the usual manner, in the axial direction of the gas turbine, the split lines extend between the individual slide-ring sections in the radial direction and are arranged to be equidistant along the periphery of the slide-ring. A segmented slide-ring makes it possible to improve the elasticity, particularly in the case of a slide-ring brush seal in which the brushes extend rectilinearly towards the rotor or stator from their fastening on the brush seal housing, it being possible to set the rectilinear brushes at an angle of between 0° and 45° to the radial, depending on the application. Particularly in the case of brushes set relative to the radial, a further advantage, in the case where the slide-ring in employed, consists in that a reversal of the direction of rotation of the rotors is readily possible.

The slide-ring can be sintered onto the free ends of the brushes. This can, for example, take place by means of carbon powder or the like.

As an alternative, the slide-ring can have, on its external peripheral surface, a recess in which the free ends of the brushes are accommodated and fastened, for example by brazing.

The slide-ring can be subsequently machined on its inner or outer peripheral surface which runs against the sealing surface on the rotor or stator, by grinding or the like, in order to improve the surface quality. The slide-ring can similarly be machined by grinding or the like on its side surface supported on the support plate, in particular in the case of applied differential pressure, in order to improve the surface quality.

In order to economize on installation space, the brushes can comprise shaft sections fastened in the brush housing and brush sections angled relative to the shaft sections, the free ends of which brush sections are directed towards the rotor or stator, the support plate in such a case having a longitudinal section essentially parallel to the shaft sections of the brushes and a support section angled relative to them and essentially parallel to the angled brash sections.

In order to improve the elasticity of a brush seal with angled brush sections having the free ends of the brushes, a free bending space with a stop acting as a bending edge can be provided between the shaft sections of the brushes and the support plate. In this way, the slide-ring provided on the free ends of the brushes adapts to any deflections of the rotor or stator of between approximately 0.2 and 0.7 mm, for example when a stationary gas turbine or an aircraft engine is being started. The angled brush sections having the free ends of the brushes and the angled support section of the support plate can be angled essentially at right angles to the shaft sections of the brushes and the longitudinal section of the support plate.

In order to further improve the sealing effect, in particular for the use of the brush seal in a moist environment, such as steam, the brushes can be impregnated in a silicon, silicard or Teflon dispersion because silicon, silicard and Teflon deposits itself on the brushes, essentially closes intermediate free spaces but the brushes remain movable and elastic within certain limits. The means used have to be selected as a function of the temperatures occurring.

Further embodiments of the invention are described in the sub-claims.

The invention is explained in more detail below with reference to drawings and using embodiment examples. In the drawing:

BRIEF DESCRIPTION OF THE DRAWINGS

FIG. 3 shows a cross-sectional view of an embodiment example, of the brush seal according to the invention, having angled brush sections;

FIG. 4 shows a cross-sectional view of another embodiment example, of the brush seal according to the invention, having angled brush sections;

DETAILED DESCRIPTION OF THE DRAWINGS

Figure 1:
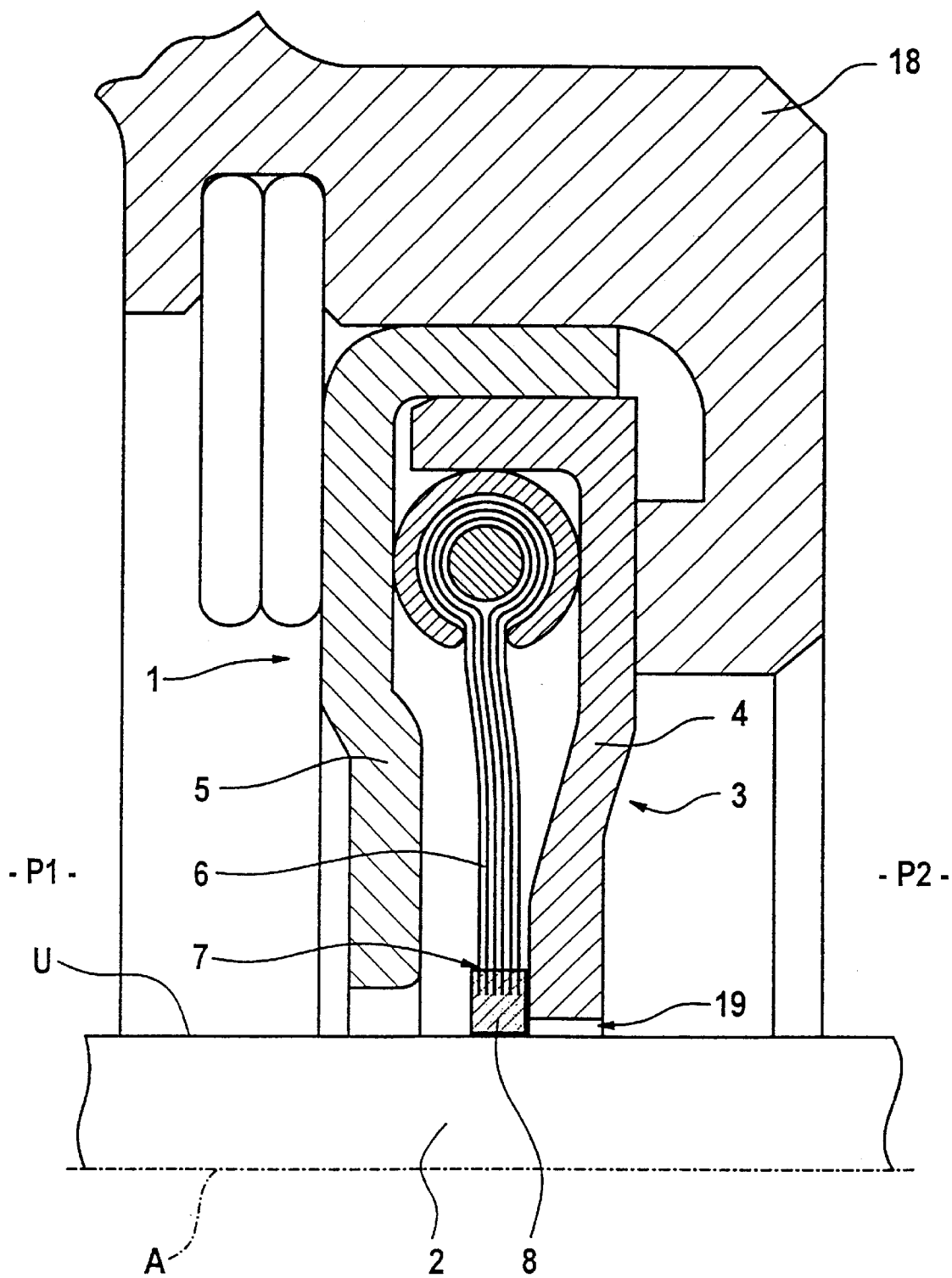
FIG. 1 shows a cross-sectional view of an embodiment example of the brush seal according to the invention.
Figure 2:
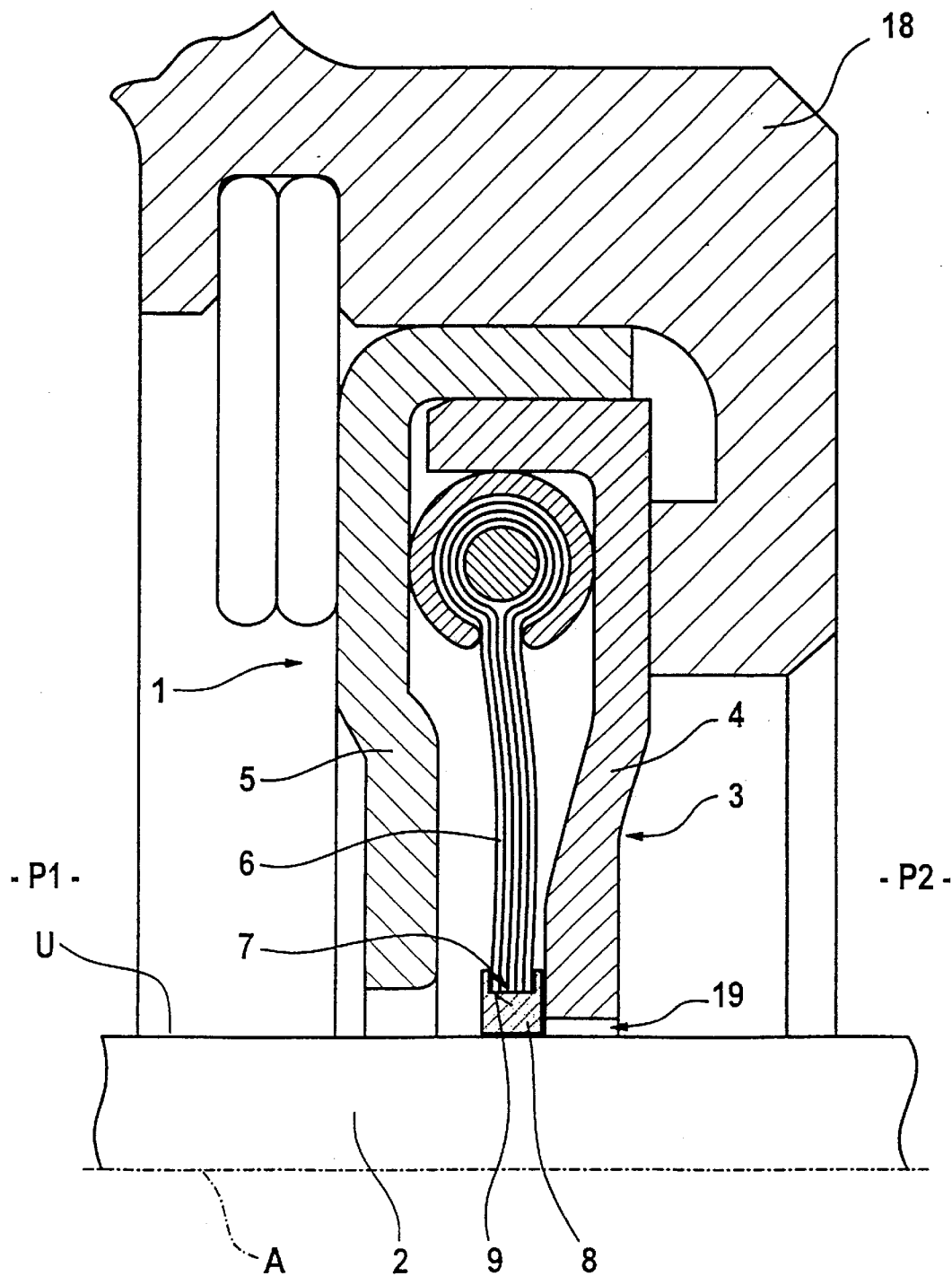
FIG. 2 shows a cross-sectional view of an alternative embodiment example of the brush seal according to the invention.

FIG. 1 shows, diagrammatically, a cross-sectional view of an embodiment example of a brush seal, which is designated in its entirety by 1 and seals the spaces with different pressures P1 and P2 by sealing a gap 19 between a rotor 2 indicated by its peripheral surface U and a stator 18, such as a housing. Such brush seals 1 have numerous applications in stationary gas turbines or aircraft engines. The center line extending in the axial direction of the gas turbine is indicated in FIG. 1 and 2 by A. The pressure P1 is greater than the pressure P2. The brush seal 1 comprises a brush housing 3 with a low-pressure end support plate 4 and a high-pressure end cover plate 5, together with brushes 6, which are fastened in a suitable manner in the brush housing 3. The brushes 6 generally consist of steel. In the present embodiment example, the brushes 6 are wound around a core, are clamped in a retaining ring arranged between the support plate 4 and the cover plate 5 and extend rectilinearly towards the rotor 2. The support plate 4 and the cover plate 5 extend around the rotor 2 and have an internal bore so that the annular gap 19 around the rotor 2 has to be sealed by the brush seal 1.

With a view to optimizing the sealing effect of the brush seal 1 and the wear behavior of the brushes 6, a slide-ring 8, shown in cross section, is provided on their free ends 7 which consists of a material which has better sliding properties than steel, of which the brushes 6 consist. The internal diameter of the slide-ring 8 corresponds in operation to the external diameter of the rotor 2 at maximum rotational speed and maximum temperature and seals, over an area, the annular gap 19 as a closed component with the excellent sealing effect of a slide-ring. In this way, the small leak of air or steam, which always occurs between the individual brushes 6 of a brush seal 1, is avoided. On its peripheral surface sealed against the rotor 2 and on a side surface, which is supported in the rest position and, in particular, when differential pressure is present at the support surface 4, the slide-ring 8 is generally machined by grinding or the like. As an alternative, the surfaces mentioned of the slide-ring 8 can already have a surface sufficiently smooth for a sealing surface when it is manufactured, for example by sintering.

FIG. 2 shows, diagrammatically and in cross section, an alternative embodiment example of a brush seal, which is designated in its entirety by 1 and which has, essentially, a brush housing 3, in which rectilinear brushes 6 are held and which consists of a support plate 4 and a cover plate 5. The free ends 7 of the brushes 6 are directed towards the peripheral surface U of the rotor 2 and have a slide-ring 8 whose inner peripheral surface runs against the sealing surface of the rotor 2 and seals, as a closed component and over an area, the annular gap 19 relative to the rotor 2. The internal diameter of the slide-ring 8 corresponds essentially to the external diameter of the rotor 2 during operation at maximum rotational speed and maximum temperature in a stationary gas turbine or an aircraft engine.

The slide-ring 8 has a recess 9 on its outer peripheral surface and has a U-shaped configuration in cross section. The free ends 7 of the brushes 6 are accommodated in the recess 9 of the slide-ring 8 and are fastened there to the slide-ring 8.by a suitable bonding method, for example by brazing. The brushes 6 remain elastic, give way on deflection of the rotor 2 and move the slide-ring 8 with them.

3 shows, diagrammatically, a cross sectional view of an embodiment example, which has angled brush sections 12, of a brush seal which is designated in its entirety by 1 and which has a brush housing 3 with a support plate 4' comprising a longitudinal section 13 and a support section 14 at an angle thereto. The angled brush sections 12 are angled essentially at right angles in order to economize on the usual arrangement of radial installation space for the shaft sections 15 of the brushes 6'. A free bending space 16 with a bending edge 17 is provided between the shaft sections 15 of the brushes 6' and the support plate 4'; the shaft sections 15 can be deflected into the free bending space 16 in the case of a deflection of the rotor 2, for example when starting the gas turbine. This measure combines the advantages of a small installation space and high elasticity of the brushes 6'.

A slide-ring 8, which seals against the sealing surface on the rotor 2 by means of a peripheral surface U, is provided on the free ends 7' of the angled brush sections 12. The slide ring 8 consists of a material with better sliding properties than steel, of which the brushes 6' consist. The slide-ring 8 consists of carbon and is provided by sintering as a closed component on the free ends 7' of the angled brush sections 12. In order to optimize the sealing effect, the inner peripheral surface of the slide-ring 8 is generally machines by grinding or the like, in order to achieve a surface with the smallest possible roughness. The side surface of the slide-ring 8, which is supported on the support section 14 of the support plate 4', is subsequently machined by grinding or the like in order to achieve a contact surface which is as flat as possible on the low-pressure end and to avoid an undesirable adhesion of the brushes 6' to the support plate 4'.

FIG. 4 shows a similar brush seal to FIG. 3 with a support plate 4' comprising a longitudinal section 13 and a support section 14, together with brushes 61, which comprise shaft sections 15 fastened in the brush housing 3 and angled brush sections 12 essentially at right angles to the shaft sections 15. The free ends 7' of the angled brush sections 12 are directed towards the peripheral surface U of the rotor 2. The slide ring 8 provided on the free ends 7' of the angled brush sections 12 has a one-piece configuration and is manufactured as a separate component. On its outer peripheral surface, the slide-ring 8 has a recess 9, in which the free ends 7' of the angled brush sections 12 are accommodated and are fastened by an appropriate method, such as brazing.

Figure 5:
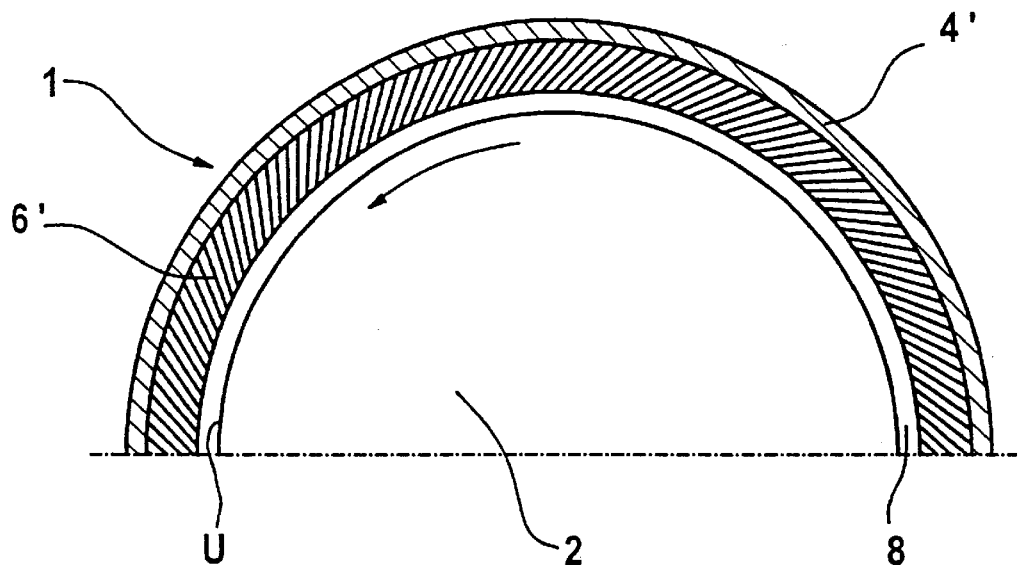
FIG. 5 shows a section view of an embodiment example, of the brush seal according to the invention, having brushes set relative to the radial.

FIG. 5 shows, diagrammatically, a section view of the embodiment example of a brush seal 1 shown in FIG. 4. This seal differs from the embodiment example shown in FIG. 3 by, in particular, the lack of the free bending space 16 between the support plate 4' and the shaft section 15 of the brushes 6. The elastic behavior of the embodiment example of the brush seal shown in FIGS. 4 and 5 is generated by setting the angled brush sections by up to 45° to the radial in such a way that when there is a deflection of the rotor 2, the shaft sections 15 of the brushes 61 twist and are subsequently moved back again into the original position as a consequence of their return force. The rotational direction of the rotor 2 is represented by an arrow in FIGS. 5 and 6.

In the case of the embodiment example of a brush seal 1 with a free bending space 16 between the support plate 4' and the shaft sections 15 of the brushes 6' shown in FIG. 3, the angled brush sections 12 can also be set at an angle of up to approximately 45° to the radial. In the case of deflections of the rotor 2, such a brush seal is found to be particularly elastic because the shaft sections 15 of the brushes 6' can give way by bending into the free bending space 16, on the one hand and by torsion, on the other, and can subsequently be moved back into their original position by the superimposed return forces. Utilizing the elastic behavior of the brush seal 1, the slide-ring 8 provided at the free ends 7' of the angled brush sections 12 can ensure optimum sealing, as a closed component, of the annular gap 19 even in the case of a deflection of the rotor 2.

Figure 6:
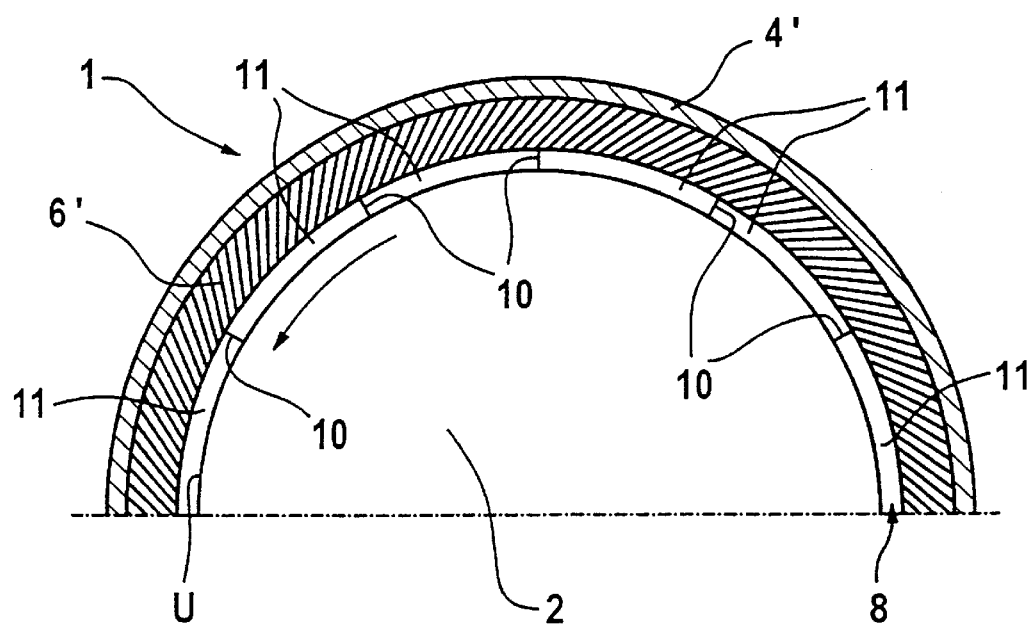
FIG. 6 shows a section view of an alternative embodiment example, of the brush seal according to the invention, having brushes set relative to the radial.

FIG. 6 shows, diagrammatically, a view along the section line from FIG. 4 of a brush seal 1 which has, in an alternative configuration, a segmented, i.e. multipart design of slide-ring 8. The slide-ring 8 is divided into a plurality of slide-ring sections 11 of equal size by the split lines 10. The segmented slide-ring 8 adapts to any deflections of the stator (not shown) or rotor 2, for example when the gas turbine is being started, by utilizing the elastic properties of the brushes 6 or 6' of a brush seal 1. The segmented slide-ring 8 is also particularly suitable for the brush seals 1, shown in FIGS. 1 and 2, with rectilinear brushes 6, whose brushes 6 are generally set at an angle of up to approximately 45° to the radial.

In all the embodiment examples, the brushes 6, 6' can be impregnated in a silicon, silicard or Teflon dispersion or the like for further improvement to the sealing effect, particularly for the use of the brush seals 1 in a moist environment, such as steam, because silicon, silicard and Teflon deposits itself on the brushes 6, 6', essentially closes intermediate free spaces but the brushes 6, 6' remain movable and elastic within certain limits and can adapt to deflections of the stator 18 or rotor 2. The means used have to be selected as a function of the temperatures arising.

What is claimed is:

1. Brush seal for sealing a rotor against a stator, comprising a brush housing for fastening brushes whose free ends are directed towards the stator or rotor, which brush housing is held on the rotor or stator and has a support plate, wherein the free ends of the brushes are fastened to a slide-ring.

2. Brush seal according to claim 1, wherein the slide-ring consists of carbon or a sintered metal.

3. Brush seal according to claim 2, wherein the slide-ring is segmented.

4. Brush seal according to claim 2, wherein the slide-ring is sintered onto the free ends of the brushes.

5. Brush seal according to claim 2, wherein the slide-ring has a recess along a peripheral surface, in which free ends of the brushes are accommodated and fastened.

6. Brush seal according to claim 2, wherein peripheral surfaces which in use are sealed against the rotor or stator, and/or a side surface of the slide-ring, which side surface is supported on the support-plate, are machined.

7. Brush seal according to claim 2, wherein the brushes are rectilinear over their whole length.

8. Brush seal according to claim 2, wherein the brushes comprise shaft sections and, angled relative to them, brush sections whose free ends are directed towards the rotor or stator.

9. Brush seal according to claim 8, wherein the support plate has a longitudinal section and a support section angled relative to it.

10. Brush seal according to claim 9, wherein a free bending space, with a stop acting as a bending edge, is configured between the shaft sections of the brushes and the support plate.

11. Brush seal according to claim 8, wherein the angled brush sections are angled essentially at right angles to the shaft section of the brushes and the support section is angled essentially at right angles to the longitudinal section of the support plate.

12. Brush seal according to claim 1, wherein the slide-ring is segmented.

13. Brush seal according to claim 12, wherein the slide-ring is sintered onto the free ends of the brushes.

14. Brush seal according to claim 12, wherein the slide-ring has a recess along a peripheral surface, in which free ends of the brushes are accommodated and fastened.

15. Brush seal according to claim 12, wherein peripheral surfaces which in use are sealed against the rotor or stator, and/or a side surface of the slide-ring, which side surface is supported on the support-plate, are machined.

16. Brush seal according to claim 12, wherein the brushes are rectilinear over their whole length.

17. Brush seal according to claim 12, wherein the brushes comprise shaft sections and, angled relative to them, brush sections whose free ends are directed towards the rotor or stator.

18. Brush seal according to claim 17, wherein the support plate has a longitudinal section and a support section angled relative to it.

19. Brush seal according to claim 18, wherein a free bending space, with a stop acting as a bending edge, is configured between the shaft sections of the brushes and the support plate.

20. Brush seal according to claim 17, wherein the angled brush sections are angled essentially at right angles to the shaft section of the brushes and the support section is angled essentially at right angles to the longitudinal section of the support plate.

21. Brush seal according to claim 1, wherein the slide-ring is sintered onto the free ends of the brushes.

22. Brush seal according to claim 21, wherein the slide-ring has a recess along a peripheral surface, in which free ends of the brushes are accommodated and fastened.

23. Brush seal according to claim 21, wherein peripheral surfaces which in use are sealed against the rotor or stator, and/or a side surface of the slide-ring, which side surface is supported on the support-plate, are machined.

24. Brush seal according to claim 1, wherein the slide-ring has a recess along a peripheral surface, in which free ends of the brushes are accommodated and fastened.

25. Brush seal according to claim 24, wherein peripheral surfaces which in use are sealed against the rotor or stator, and/or a side surface of the slide-ring, which side surface is supported on the support-plate, are machined.

26. Brush seal according to claim 1, wherein peripheral surfaces which in use are sealed against the rotor or stator, and/or a side surface of the slide-ring, which side surface is supported on the support-plate, are machined.

27. Brush seal according to claim 1, wherein the brushes are rectilinear over their whole length.

28. Brush seal according to claim 1, wherein the brushes comprise shaft sections and, angled relative to them, brush sections whose free ends are directed towards the rotor or stator.

29. Brush seal according to claim 28, wherein the support plate has a longitudinal section and a support section angled relative to it.

30. Brush seal according to claim 29, wherein the angled brush sections are angled essentially at right angels to the shaft section of the brushes and the support section is angled essentially at right angles to the longitudinal section of the support plate.

31. Brush seal according to claim 29, wherein a free bending space, with a stop acting as a bending edge, is configured between the shaft sections of the brushes and the support plate.

32. Brush seal according to claim 28, wherein the angled brush sections are angled essentially at right angles to the shaft section of the brushes and the support section is angled essentially at right angles to the longitudinal section of the support plate.

33. Brush seal according to claim 32, wherein a free bending space, with a stop acting as a bending edge, is configured between the shaft sections of the brushes and the support plate.

34. Brush seal according to claim 28, wherein a free bending space, with a stop acting as a bending edge, is configured between the shaft sections of the brushes and the support plate.

35. Brush seal according to claim 1, wherein the brushes are set at an angle of up to 45° to a radial end of the rotor or stator.

36. Brush seal according to claim 1, wherein the brushes are impregnated in a silicone or silicard or Teflon dispersion.

37. A method of making a brush seal for sealing a rotor against a stator, comprising:
   attaching a seal housing to one of a rotor and a stator of a machine having the rotor facing the stator,
   fastening a plurality of brush bristles to said seal housing such that, in use, free ends of the brush bristles will face the other of the rotor and stator, and
   fastening a slide-ring to the free ends of the brush bristles, which slide-ring, in use, slidably engages the other of the rotor and stator.

38. A method according to claim 37, wherein said slide-ring consists of one of carbon and sintered metals.

39. A method according to claim 37, wherein the slide-ring is segmented.

40. A method according to claim 37, wherein the slide-ring is sintered onto the free ends of the brushes.

41. A method according to claim 37, comprising machining surfaces of the slide-ring which in use engage the seal housing and the other of the rotor and stator.

42. A method according to claim 37, wherein the slide-ring has a recess along a peripheral surface, in which free ends of the brushes are accommodated and fastened.

43. A method according to claim 37, wherein peripheral surfaces which in use is sealed against the rotor or stator, and/or a side surface of the slide-ring, which side surface is supported on the support-plate, are machined.

44. A method according to claim 37, wherein the brushes are rectilinear over their whole length.

45. A method according to claim 37, wherein the brushes comprise shaft sections and, angled relative to them, brush sections whose free ends are directed towards the rotor or stator.

46. A method according to claim 45, wherein the housing includes a support plate, and wherein the support plate has a longitudinal section and a support section angled relative to it.

47. A method according to claim 45, wherein the angled brush sections are angled essentially at right angles to the shaft section of the brushes and the support section is angled essentially at right angles to the longitudinal section of the support plate.

48. A method according to claim 37, wherein the brushes are impregnated in a silicone or silicard or Teflon dispersion.

* * * * *